United States Patent [19]

Kuhl

[11] Patent Number: 4,698,868
[45] Date of Patent: Oct. 13, 1987

[54] EGG WASHING CONVEYOR APPARATUS

[76] Inventor: Henry Y. Kuhl, Kuhl Rd., P.O. Box 26, Flemington, N.J. 08822

[21] Appl. No.: 889,136

[22] Filed: Jul. 24, 1986

[51] Int. Cl.⁴ ............................................. A01K 43/00
[52] U.S. Cl. ..................................... 15/3.13; 15/3.16
[58] Field of Search .................... 15/3.1, 3.12–3.18; 134/6

[56] References Cited

U.S. PATENT DOCUMENTS

| | | |
|---|---|---|
| 1,074,940 | 10/1913 | Freer . |
| 1,113,190 | 10/1914 | Brandt . |
| 1,205,117 | 11/1916 | Stamm . |
| 1,423,059 | 7/1922 | Williamson . |
| 1,542,347 | 6/1925 | McCullough . |
| 1,723,441 | 8/1929 | Richards . |
| 1,777,039 | 9/1930 | Hatch . |
| 1,780,924 | 11/1930 | Ingraham . |
| 1,955,749 | 4/1934 | Jones . |
| 1,964,275 | 6/1934 | Secondo . |
| 2,035,587 | 3/1936 | Brandenburg . |
| 2,179,474 | 11/1939 | Stebler . |
| 2,183,033 | 12/1939 | Segrin . |
| 2,199,831 | 5/1940 | Cunning . |
| 2,301,931 | 11/1942 | Davis . |
| 2,371,867 | 3/1945 | Bayles . |
| 2,412,565 | 12/1946 | Davis . |
| 2,442,475 | 6/1948 | Swanson . |
| 2,538,331 | 1/1951 | Ruzsicska . |
| 2,587,730 | 3/1952 | Hutchinson et al. . |
| 2,588,787 | 3/1952 | Wright . |
| 2,632,901 | 3/1953 | Markusen et al. . |
| 2,640,209 | 6/1953 | Johnson . |
| 2,673,361 | 3/1954 | McCutchan . |
| 2,979,746 | 4/1961 | Willsey . |
| 3,049,135 | 8/1962 | Kuhl et al. . |
| 3,099,848 | 8/1963 | Mountz . |
| 3,203,435 | 8/1965 | Kurtz . |
| 3,252,607 | 5/1966 | Rose et al. . |
| 3,349,419 | 10/1967 | Kuhl et al. . |
| 3,360,817 | 1/1968 | Halverson . |
| 3,392,414 | 7/1968 | Cathcart . |
| 3,909,290 | 9/1975 | Peppler et al. . |
| 4,276,977 | 7/1981 | van Kattenbroek . |
| 4,353,455 | 10/1982 | Mumma et al. . |
| 4,358,341 | 11/1982 | Berquist . |
| 4,499,623 | 2/1985 | Kuhl . |

FOREIGN PATENT DOCUMENTS

| | | |
|---|---|---|
| 758340 | 10/1932 | France . |
| 552170 | 12/1956 | Italy . |
| 164729 | 9/1970 | Netherlands . |
| 258761 | 4/1970 | U.S.S.R. . |

Primary Examiner—Edward L. Roberts
Attorney, Agent, or Firm—Sperry, Zoda & Kane

[57] ABSTRACT

An egg washing conveyer apparatus particularly usable with eggs arranged in rows with the long axes thereof extending laterally with respect to the direction of movement of the conveyor including a brushing member which extends longitudinally between the individual rows of egg receiving recesses downwardly and obliquely inwardly toward each side of each row to provide complete brushing of the ends of the eggs which normally are not cleaned by a conventional overhead brushing apparatus. The present invention also includes the conventional overhead brushing apparatus for cleaning the major external portion of the egg which in combination with the end cleaning brushes provide complete cleaning of an egg surface by one washing station.

16 Claims, 2 Drawing Figures

EGG WASHING CONVEYOR APPARATUS

BACKGROUND OF THE INVENTION

1. Field of the Invention

The present invention deals with the field of devices usable for the cleaning of eggs carried upon conveying systems in orderly rows. The present invention is particularly usable for cleaning of eggs which are arranged with the long axes oriented laterally with respect to the longitudinal direction of movement of the conveying apparatus.

Such apparatus is normally utilized as an initial step when eggs are removed from a conventional poultry house in order to clean the eggs such that they are readily prepared for further processing which may include candling, grading by weight, inspection, packing or other various steps.

2. Description of the Prior Art

Previously used devices are capable of complete washing of the eggs as they are carried upon a conveyer therebelow. Such a washing station normally includes a configuration of conventional brushes which may be cylindrical, flat brushes or other similar means of applying washing bristles or the like to the external surface of an egg.

Normally these brushes are positioned immediately above the egg such as that when the egg passes thereunder, the egg contacts the washing means and the external surface of the egg is thereby cleaned. However when eggs are oriented with the long axes laterally with respect to the longitudinal direction of movement of the conveyer, the ends of the eggs are rarely cleaned. This is due to the fact that in order to clean the egg ends it would be necessary to have the brush so close to the conveyer that damage to the high points of the eggs is significantly increased. The present invention provides a novel means for cleaning of the ends of the eggs when arranged with the long axes lateral which does not increase the probability of a breakage of the high points of the eggs.

SUMMARY OF THE INVENTION

The present invention provides an egg washing conveyer apparatus which is particularly usable with eggs arranged in rows with the long axes thereof oriented extending laterally which includes a main frame to which the movable conveyer can be secured. The main frame defines a path for placement and movement of the conveyer. The conveyer defines egg receiving recesses therein which are arranged in a plurality of rows extending longitudinally therealong. These egg receiving recesses are preferably adapted to carry eggs with the long axes oriented laterally.

A brush frame is preferably movably secured with respect to the main frame and is located immediately above the conveyer such as to be longitudinally movable with respect to the conveyer. A primary brushing means is secured with respect to the brush frame preferably in a detachable manner. This primary brush means is positioned immediately above each of the rows of egg receiving recesses to thereby have bristles thereof extending downwardly into abutting contact with respect to the eggs being conveyed thereunder.

A secondary brush means is positioned extending longitudinally with respect to the main frame and is secured with respect to the brush frame means at positions adjacent to the rows of egg receiving recesses. The bristles of the secondary brush means preferably extend downwardly in a laterally oblique direction to thereby be in abutting contact with respect to the sides of the rows of eggs being carried thereunder by the conveyer.

A brush frame movement means is secured with respect to the brush frame to allow reciprocating longitudinal movement of the brush frame means with respect to the conveying means located therebelow.

A solution supply conduit is positioned above the brush frame for providing cleaning solution to facilitate cleaning of the eggs being carried upon the conveyer. A plurality of spray nozzles are preferably positioned in the solution supply conduit in fluid flow communication with respect to the cleaning solution therein. The spray nozzles are adapted to dispense the cleaning solution downwardly onto the primary brushes and the secondary brushes and onto the eggs traveling upon the conveyer therebelow to facilitate cleaning thereof. Preferably the secondary brushes are flat brushes which are oriented extending longitudinally with respect to the direction of movement of the conveying means. These flat brushes are preferably organized in two manners. Initially the two outer flat brushes on each opposite side of the conveyer comprise the outer flat brush assembly adapted to contact the outermost ends of the eggs in the outermost rows being carried by the conveying means. Secondly a plurality of intermediate flat brush assemblies are positioned secured to the brush frame between adjacent rows of egg receiving recesses and extend obliquely downwardly to contact the adjacent sides of eggs being carried in each pair of adjacent rows of egg receiving recesses.

The conveying means of the present invention preferably is formed by a plurality of rollers presenting an upwardly facing arcuate surface to define the egg receiving recesses such that the eggs will have the long axes oriented extending laterally. Preferably there will be six rows of these egg receiving recesses defined by these rollers.

The primary brush means as well as the secondary brush means are preferably detachable with respect to the brush frame to facilitate cleaning thereof or to allow replacement of worn or deteriorated brushes.

The present invention preferably includes a brush frame suspension apparatus which is pivotally secured at one end to the main frame and pivotally secured at the other end to the brush frame. This brush frame movement means will allow longitudinal movement of the brush frame with respect to the conveyer and eggs positioned therebelow. A brush frame movement means will also be included which can comprise a drive means having rotational output shaft and a crank arm fixedly secured at one end to the rotational output shaft. A connecting rod will be pivotally secured at one end to the brush frame means and at the other end will be pivotally secured with respect to the crank arm to allow longitudinal movement of the brush frame responsive to actuation of the drive means.

To allow a variation in spacing between the bottom of the bristles of each brush means with respect to the eggs being carried upon the conveyer, a vertical adjustment means will be included which may take the form of several possible apertures in the main frame to which the brush frame can be pivotally secured. The bristles of the primary and secondary brush means can take various forms, however, the preferred configuration would be nylon bristles and/or silicon carbide abrasive bristles.

It is an object of the present invention to provide an egg washing conveyer apparatus which is particularly usable with eggs arranged in rows with the long axes thereof oriented extending laterally.

It is an object of the present invention to provide an egg washing conveyer apparatus which is particularly adaptable for the cleaning of the outermost sides of eggs being carried upon the conveyer therebelow.

It is an object of the present invention to provide an egg washing conveyer apparatus wherein flat brushes are extended longitudinally between adjacent rows of eggs to facilitate washing the ends thereof.

It is an object of the present invention to provide an egg washing conveyer apparatus wherein flat brushes are positioned between adjacent rows of eggs and are inclined toward each adjacent row to facilitate cleaning of the entire outer surface of the egg therebelow.

It is an object of the present invention to provide an egg washing conveyer apparatus wherein conventional brushing means is positioned immediately above the egg and longitudinally extending flat brushes are positioned between adjacent rows of eggs to facilitate washing of the outer surface thereof.

It is an object of the present invention to provide an egg washing conveyer apparatus wherein rollers are utilized in the conveyer apparatus to facilitate the orientation of the eggs with the long axes extending laterally with respect to the longitudinal direction of movement of the conveyer to facilitate cleaning of the ends thereof by flat brushes extending longitudinally also.

It is an object of the present invention to provide an egg washing conveyer apparatus wherein means are provided for moving of the longitudinally extending flat brushes longitudinally back and forth in a reciprocating manner with respect to the direction of movement of the eggs on the conveyer therebelow.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
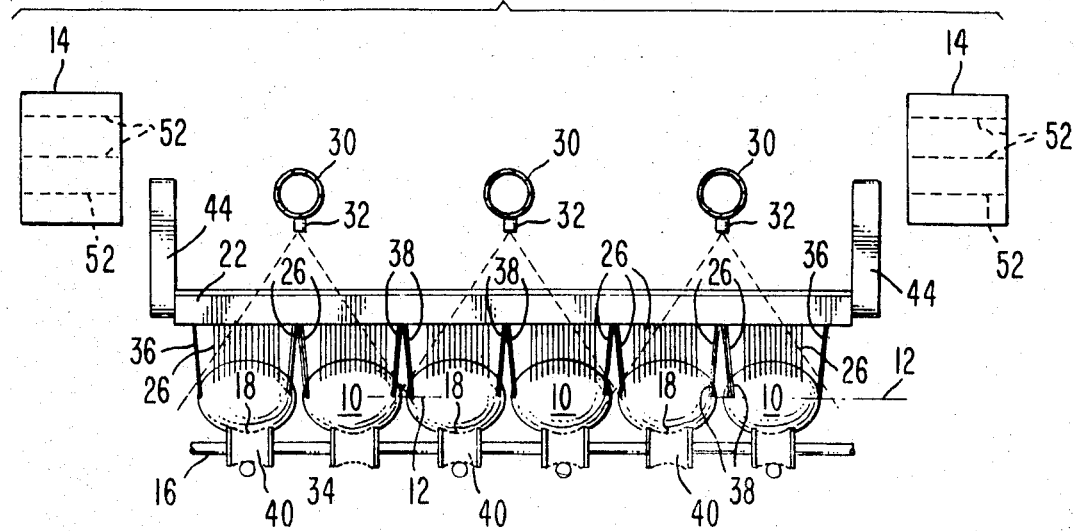
FIG. 1 is a front plan view of an embodiment of the egg washing conveyer apparatus of the present invention.

The present invention provides an egg washing conveyer apparatus which includes a novel brush configuration to allow for the cleaning of eggs 10 over the entire external surface thereof. The conveyer apparatus of this invention includes a conveying means 16 defining a plurality of egg receiving recesses 18 which orient eggs 10 with the long axes 12 thereof oriented laterally with respect to the direction of movement of conveying means 16.

The configuration of the present invention includes a main frame means 14 through which the conveying means 16 moves longitudinally. The conveying means 16 preferably defines six rows 20 of egg receiving recesses 18 with the eggs having the long axes 12 oriented laterally.

A brush frame means 22 is preferably positioned immediately above the conveying means 16 to allow for contact of brushes carried thereby with respect to the eggs 10 therebelow. Brush frame means 22 is adapted to have detachably secured thereto a primary brush means 24 which includes conventional egg washing and brushing configurations positioned immediately above the eggs 10 being carried within rows 20. Brush frame means 22 also includes a secondary brush means 26 mounted thereon which includes preferably longitudinally extending flat brushes which are positioned adjacent to the rows of egg receiving recesses and extend downwardly in a laterally oblique direction in such a manner as to be in abutting contact with respect to the sides or pointed ends of the eggs located in the rows within the egg receiving recesses. This secondary brush means 26 thereby provides the means through these longitudinally extending flat brushes for direct cleaning of the opposite ends of the eggs so oriented.

A brush frame movement means 28 may be included in the present invention to provide a means for pivotal securement of the brush frame 22 with respect to the main frame 14. Preferably the brush frame movement means 28 takes the form of a bracket being pivotally secured at one end to the main frame means 14 and pivotally secured at the other end to the brush frame means 22.

A solution supply conduit 30 is positioned immediately above the brush frame means 22 and is adapted to carry cleaning solution therein. A plurality of spray nozzle means 32 are positioned extending downwardly from the solution supply conduit 30 in such a manner as to dispense cleaning solution downwardly onto the eggs 10 being carried upon the conveying means 16 and also onto the primary brush means 24 and the secondary brush means 26 being carried by the brush frame means 22.

The secondary brush means 26 will preferably be formed including an outer flat brush assembly 36. There will preferably be two such outer flat brush assemblies 36 each including a flat brush 34 extending longitudinally and secured with respect to the brush frame means 22 in a detachable manner along the outermost lateral edges thereof. These outer flat brush assemblies 36 will be inclined inwardly toward the outermost edges of those eggs traveling in the outermost rows of eggs. In this manner the outermost edges of the outermost eggs will be efficiently cleaned.

The secondary brush means 26 will also preferably include an intermediate flat brush assembly 38 which will include a plurality of flat brushes 34 extending longitudinally between adjacent rows of egg receiving recesses 18. Intermediate assemblies 38 will each include two flat brushes oriented longitudinally and inclined away from one another such that they extend downwardly toward the edges of the adjacent rows of eggs. In this manner cleaning of each adjacent row of eggs will be achieved on the outermost ends thereof. With a configuration utilizing six rows 20 of egg receiving recesses 18, there will be five such intermediate flat brush assemblies 38 within the specific configuration.

Preferably the conveying means of the present invention includes conveyer rollers 40 which may be of rubber or other material which define arcuate upper surfaces to structure the egg receiving recesses in such a manner as to orient the eggs 10 with the long axes extending laterally.

The primary brush means 24 located immediately above each of the rows of eggs for direct cleaning of the external surface thereof can be of any chosen brushing configuration but may be a solid brushing element.

Figure 2:
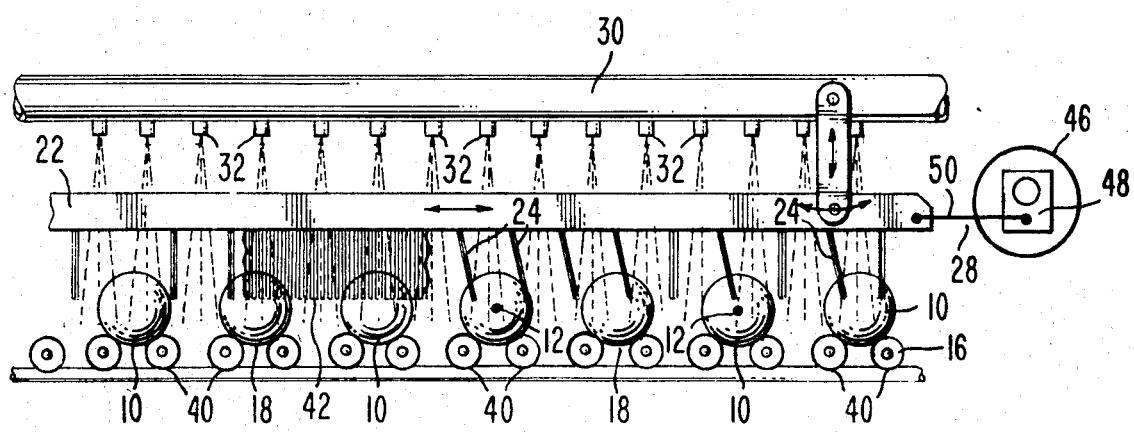
FIG. 2 is a side plan view of the embodiment shown in FIG. 1.

The brush frame suspension means 44 of the present invention can comprise a bracketed element which is pivotally secured with respect to the main frame 14 and the brush frame 28. Movement of the brush frame suspension means 44 is achieved by one configuration shown in FIG. 2 of the present invention wherein a drive means 46 has an output shaft which is secured with respect to a crank arm 48. A connecting rod 50 secures the crank arm 48 with respect to the brush frame means 22 and in that manner allows for longitudinal reciprocating movement of the brush frame 22 with respect to the conveyer 16 and eggs 10 being carried therebelow. To allow the present invention to be utilized with various sized eggs the position of pivotal securement of the brush frame suspension means 44 with respect to the main frame 14 can be varied in different apertures as shown by vertical adjustment means 52. Chosing these different apertures will allow the spacing between the bottom of the bristles of the brush with respected eggs to be varied in accordance to which aperture the brush frame suspension means 44 is secured to.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An egg washing conveyer apparatus, particularly usable with eggs arranged in rows with the long axes thereof oriented extending laterally, which comprises:
   (a) a main frame means;
   (b) a conveying means defining egg receiving recesses arranged in a plurality of rows extending longitudinally therealong, said egg receiving recesses adapted to carry eggs with the long axes thereof oriented laterally with respect to said conveying means;
   (c) a brush frame means movably secured with respect to said main frame means and immediately above said conveying means, said brush frame means being longitudinally movable with respect to said conveying means;
   (d) a primary brush means secured with respect to said brush frame means and positioned immediately above each of said rows of egg receiving recesses to extend downwardly into abutting contact with the eggs being conveyed thereunder;
   (e) a secondary brush means extending longitudinally with respect to said main frame means and being secured with respect to said brush frame means at positions adjacent rows of said egg receiving recesses and extending downwardly in a laterally oblique direction to be in abutting contact with respect to the sides of the rows of eggs being carried thereunder by said conveying means;
   (f) a brush frame movement means operably secured with respect to said brush frame means to allow reciprocating longitudinal movement of said brush frame means with respect to said conveying means located therebelow;
   (g) a solution supply conduit positioned above said brush frame means for providing cleaning solution to facilitate cleaning of the eggs traveling upon said conveying means therebelow; and
   (h) a spray nozzle means positioned in said solution supply conduit and in fluid flow communication with respect to the cleaning solution therein for dispensing same from said solution supply conduit downwardly onto said primary brush means and said secondary brush means and onto the eggs traveling upon said conveying means therebelow to facilitate cleaning thereof.

2. The apparatus as defined in claim 1 wherein said secondary brush means comprises a flat brush means oriented extending longitudinally with respect to said conveying means.

3. The apparatus as defined in claim 2 wherein said flat brush means comprises:
   (a) two outer flat brush assemblies positioned on each opposite outer side of said brush frame means to contact the outer ends of eggs traveling in each opposite outermost row of said egg receiving recesses defined by said egg conveying means; and
   (b) a plurality of intermediate flat brush assemblies secured to said brush frame means and being positioned between adjacent rows of egg receiving recesses and extending obliquely downwardly to contact the adjacent sides of eggs being carried in each pair of adjacent rows of egg receiving recesses defined by said egg conveying means.

4. The apparatus as defined in claim 1 wherein said conveying means is a roller conveying device.

5. The apparatus as defined in claim 1 wherein said conveying means defined six rows of egg receiving recesses extending longitudinally therealong.

6. The apparatus as defined in claim 1 wherein said primary brush means is detachably secured with respect to said brush frame means to facilitate cleaning and replacement thereof.

7. The apparatus as defined in claim 1 wherein said secondary brush means is detachably secured with respect to said brush frame means to facilitate cleaning and replacement thereof.

8. The apparatus as defined in claim 1 wherein said primary brush means comprises a solid brushing element extending longitudinally along said brush frame means.

9. The apparatus as defined in claim 1 wherein said brush frame movement means includes a brush frame suspension means being pivotally secured at one end to said main frame means and being pivotally secured at the other end to said brush frame means.

10. The apparatus as defined in claim 1 wherein said brush frame movement means includes:
   (a) a drive means including a rotational output shaft;
   (b) a crank arm fixedly secured at one end to said rotational output shaft; and
   (c) a connecting rod pivotally secured at one end to said brush frame means and pivotally secured at the other end to said crank arm at the opposite end thereof from said rotational output shaft.

11. The apparatus as defined in claim 1 wherein said brush frame means is adjustably positionable vertically with respect to said conveying means.

12. The apparatus as defined in claim 1 wherein said primary and secondary brush means include bristles of nylon.

13. The apparatus as defined in claim 1 wherein said primary and secondary brush means include bristles of silicon carbide.

14. An egg washing conveyer apparatus, particularly usable with eggs arranged in rows with the long axes thereof oriented extending laterally, which comprises:
   (a) a main frame means;
   (b) a conveying means defining egg receiving recesses arranged in six rows extending longitudinally therealong, said egg receiving recesses adapted to carry eggs with the long axes thereof oriented laterally with respect to said conveying means, said conveying means including roller conveying support members;
   (c) a brush frame means movably secured with respect to said main frame means and immediately above said conveying means, said brush frame means being longitudinally movable with respect to said conveying means, said brush frame means being adjustably positionable vertically with respect to said conveying means;
   (d) a primary brush means detachably secured with respect to said brush frame means and positioned immediately above each of said rows of egg receiving recesses to extend downwardly into abutting contact with the eggs being conveyed thereunder;
   (e) a secondary brush means comprising flat brush means extending longitudinally with respect to said main frame means and being detachably secured with respect to said brush frame means at positions adjacent rows of said egg receiving recesses and extending downwardly in a laterally oblique direction to be in abutting contact with respect to the sides of the rows of eggs being carried thereunder by said conveying means, said secondary brush means comprising;
      (1) two outer flat brush assemblies positioned on each opposite outer side of said brush frame means to contact the outer ends of eggs traveling in each opposite outermost row of said egg receiving recesses defined by said egg conveying means;
      (2) five intermediate flat brush assemblies secured to said brush frame means and being positioned between adjacent rows of egg receiving recesses and extending obliquely downwardly to contact the adjacent sides of eggs being carried in each pair of adjacent rows of egg receiving recesses defined by said egg conveying means;
   (f) a brush frame movement means operably secured with respect to said brush frame means to cause reciprocating longitudinal movement of said brush frame means with respect to said conveying means located therebelow, said brush frame movement means including a brush frame suspension means being pivotally secured at one end to said main frame means and being pivotally secured at the other end to said brush frame means, said brush frame suspension means further comprising:
      (1) a drive means including a rotational output shaft;
      (2) a crank arm fixedly secured at one end to said rotational output shaft;
      (3) a connecting rod pivotally secured at one end to said brush frame means and pivotally secured at the other end to said crank arm at the opposite end thereof from said rotational output shaft;
   (g) a solution supply conduit positioned above said brush frame means for providing cleaning solution to facilitate cleaning of the eggs traveling upon said conveying means therebelow; and
   (h) a spray nozzle means positioned in said solution supply conduit and in fluid flow communication with respect to the cleaning solution therein for dispensing same from said solution supply conduit downwardly onto said primary brush means and said secondary brush means and onto the eggs traveling upon said conveying means therebelow to facilitate cleaning thereof.

15. The apparatus as defined in claim 14 wherein said primary and secondary brush means include bristles of nylon.

16. The apparatus as defined in claim 15 wherein said primary and secondary brush means include bristles of silicon carbide.

* * * * *